(12) United States Patent
Kuo et al.

(10) Patent No.: US 7,879,133 B2
(45) Date of Patent: Feb. 1, 2011

(54) METHOD FOR MEASURING AN OUTLINE OF A STRATUM OF A REACTANT AND A PATH OF CHARGING THE REACTANT IN A BLAST FURNACE

(75) Inventors: Shih-Kang Kuo, Kaohsiung (TW);
Wen-Chieh Li, Kaohsiung (TW);
Shan-Wen Du, Pingtung Hsien (TW)

(73) Assignee: China Steel Corporation, Kaohsiung (TW)

( * ) Notice: Subject to any disclaimer, the term of this patent is extended or adjusted under 35 U.S.C. 154(b) by 816 days.

(21) Appl. No.: 11/802,866

(22) Filed: May 25, 2007

(65) Prior Publication Data

US 2008/0289449 A1    Nov. 27, 2008

(51) Int. Cl.
*C21B 7/20* (2006.01)
(52) U.S. Cl. .......................................... 75/458; 75/460
(58) Field of Classification Search ................. 75/458, 75/460
See application file for complete search history.

(56) References Cited

U.S. PATENT DOCUMENTS 4,110,617 A * 8/1978 Legille ........................ 250/342
4,912,987 A * 4/1990 Yashiro et al. ............... 73/865.5

FOREIGN PATENT DOCUMENTS

JP       62-081513      4/1987
JP       2006-112966    4/2006

OTHER PUBLICATIONS

Written translation of Samuel et al, FR 2,506,329 A1, published Nov. 26, 1982.*
Derwent Acc No. 1995-262309 for RU 2027773, published Jan. 3, 1991. Abstract.*

* cited by examiner

*Primary Examiner*—George Wyszomierski
*Assistant Examiner*—Tima M McGuthry-Banks
(74) *Attorney, Agent, or Firm*—Muncy, Geissler, Olds & Lowe, PLLC (57) ABSTRACT

A method has steps of providing a three-dimensional (3-D) laser scanner, providing a computer, obtaining point group data (PGD) and calculating measuring an outline of a top reactant stratum from the PGD. The step of providing a 3-D laser scanner directs a 3-D laser scanner at reactant strata in a blast furnace and output PGD that represent digital data of an inside of the blast furnace. The step of providing a computer connects the 3-D laser scanner to a computer having a point group analysis program. The step of calculating an outline of the top reactant stratum from the PGD is performed by the point group analysis program to calculate an outline of the top reactant stratum in the blast furnace from the PGD. At least one two-dimensional laser scanner is used to measure a path of the reactant being charged.

11 Claims, 6 Drawing Sheets

METHOD FOR MEASURING AN OUTLINE OF A STRATUM OF A REACTANT AND A PATH OF CHARGING THE REACTANT IN A BLAST FURNACE

BACKGROUND OF THE INVENTION

1. Field of the Invention

The present invention relates to a method, and more particularly to a method for measuring an outline of a stratum of a reactant and a path of charging the reactant in a blast furnace.

2. Description of Related Art

A Blast furnace is a huge chemical reaction device. The blast furnace has multiple reactants. The reactants are layered in stratum, comprise coke and iron ore and proceeds oxidation-reduction reaction to reduce the iron oxides into pig iron. Additionally, gas as carbon monoxide is generated in the blast furnace when proceeding the oxidation-reduction reaction. Distribution of the gas influences the efficiency of the oxidation-reduction reaction. Furthermore, the gas distribution is related to the outline of the top reactant stratum in the blast furnace and paths of charging the reactants.

Two methods are used to measure the outline of the top reactant stratum in the blast furnace today. One method is called indirect measuring method. The indirect measuring method comprises steps of determining the paths of charging the reactants and measuring an outline of the top reactant stratum in the blast furnace. An equation of the paths of charging the reactants is obtained after proceeding the step of determining the paths of charging the reactants. The step of measuring an outline of the top reactant stratum in the blast furnace comprises integrating the equation of the paths of charging the reactants.

Another method is called direct measuring method. The direct measuring method is performed by a microwave distance measuring device to determine the outline of the top reactant stratum in the blast furnace after finishing charging the reactants.

However, measuring the outline of the top reactant stratum in the blast furnace and determining the paths of reactants when charging the reactants are difficult because the temperature and the pressure inside the blast furnace are extremely high. The methods described cannot provide accurate results.

To overcome the shortcomings, the present invention provides a method for measuring an outline of a stratum of a reactant and a path of charging the reactant in a blast furnace to mitigate or obviate the aforementioned problems.

SUMMARY OF THE INVENTION

The main objective of the invention is to provide a method for measuring the outline of a reactant layer in a blast furnace and the path of charging the reactant.

A method in accordance with the present invention comprises steps of providing a three-dimensional (3-D) laser scanner, providing a computer, obtaining point group data (PGD) and calculating an outline of a top reactant stratum from the PGD. The step of providing a 3-D laser scanner directs a 3-D laser scanner at reactant strata in a blast furnace and outputs PGD that represent digital data of an inside of the blast furnace. The step of providing a computer comprises connecting the 3-D laser scanner to a computer having a point group analysis program. The step of calculating an outline of the top reactant stratum from the PGD is performed by the point group analysis program to calculate measure an outline of the top reactant stratum in the blast furnace from the PGD.

At least one two-dimensional laser scanner is used to measure a path of the reactant being charged.

Other objectives, advantages and novel features of the invention will become more apparent from the following detailed description when taken in conjunction with the accompanying drawings.

DETAILED DESCRIPTION OF PREFERRED EMBODIMENT

Figure 2:
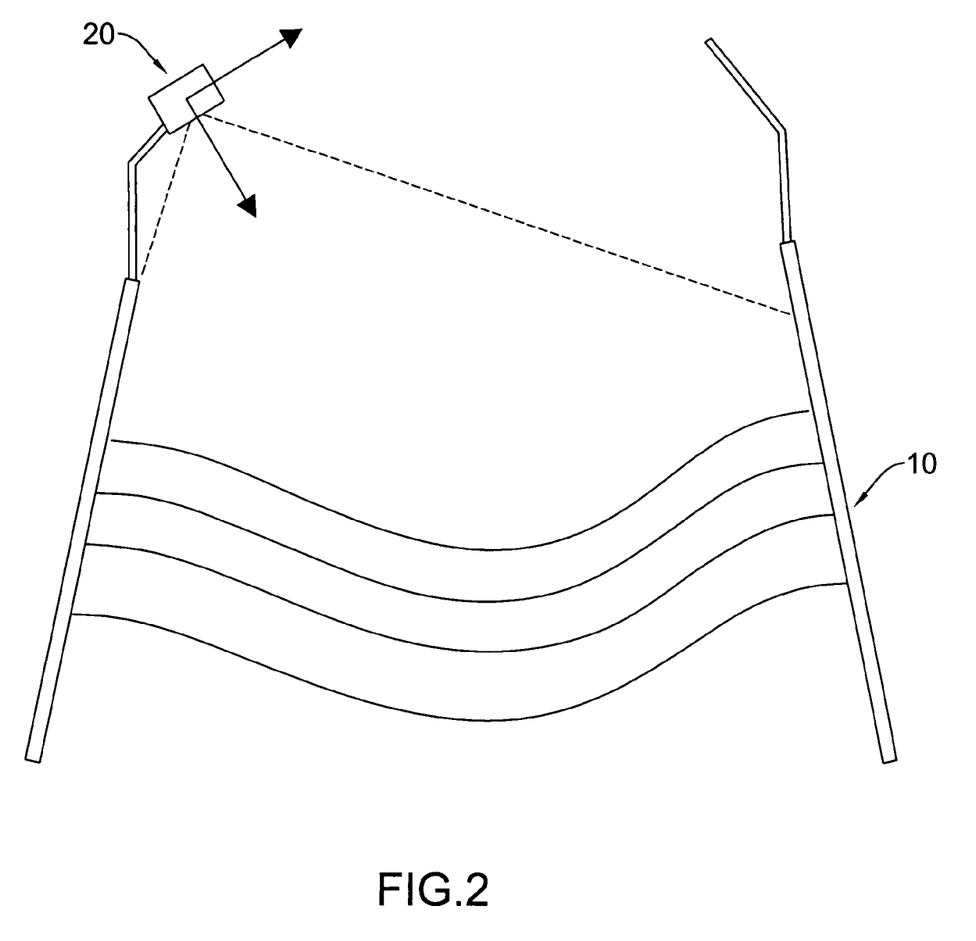
FIG. 2 is a diagram of a 3-D laser scanner mounted at a neck of a blast furnace.
Figure 7:
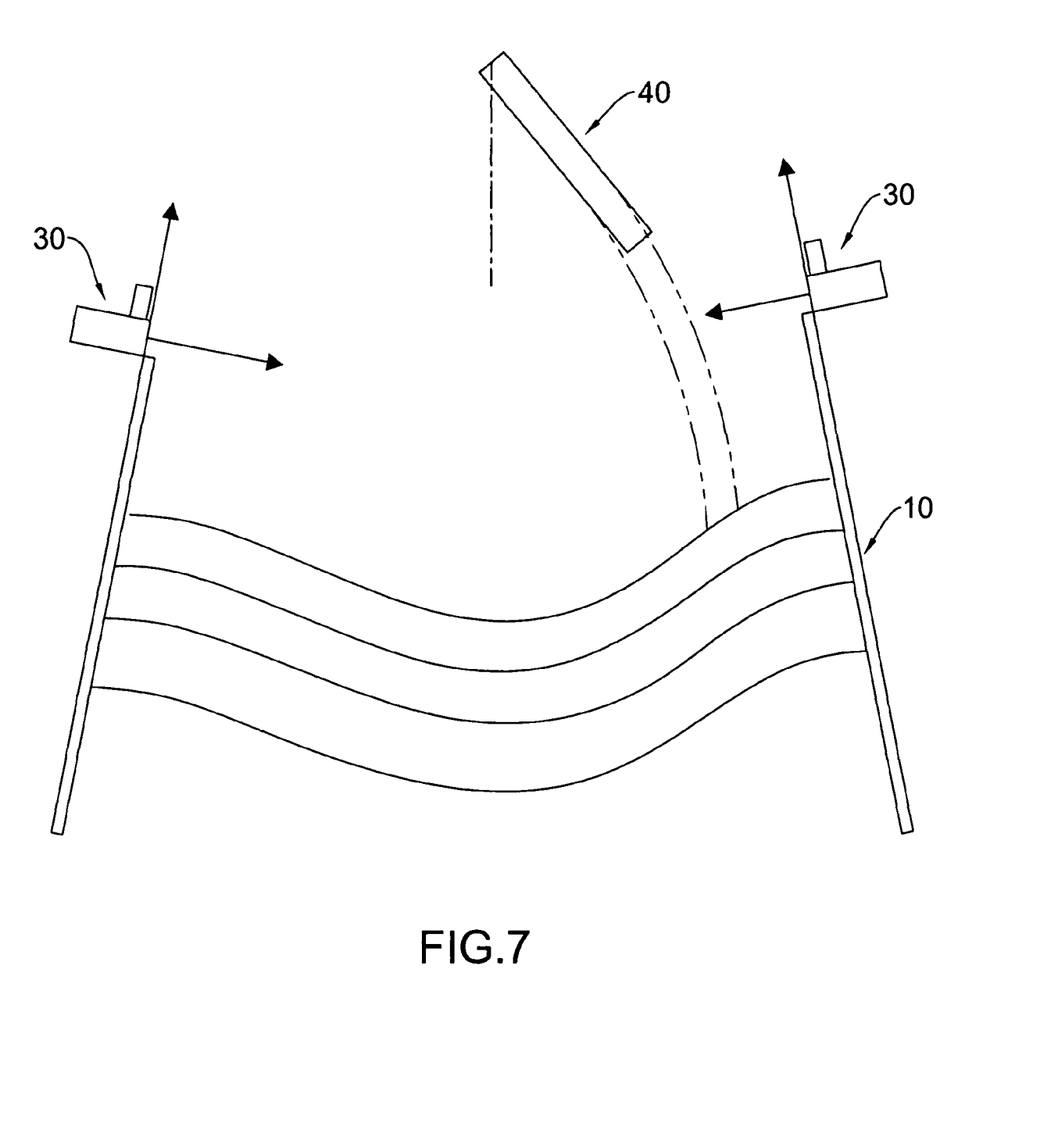
FIG. 7 is an operational diagram of two 2-D laser scanners mounted on two lateral walls of the blast furnace.

With reference to FIGS. 2 and 7, a method measures an outline of a stratum of a reactant in a blast furnace (10). The blast furnace (10) is a container. The container has an inner surface, multiple reactants and an inside, a top, a neck, a feeder (40) and two lateral walls and may be cone shaped. The reactants are coke and iron ore and are layered in stratum in the container. The reactant strata are piled on top of each other in the blast furnace (10), cover part of the inner surface of the blast furnace (10), respectively have an outline, an optional volume and an optional thickness. The inside is the exposed inner surface of the blast furnace and the outline of the top reactant stratum. The neck is defined at the top of the blast furnace (10) and has an opening. The feeder (40) is mounted at the opening of the neck of the blast furnace (10) to charge coke and iron ore into the blast furnace (10) in turn.

Figure 1:
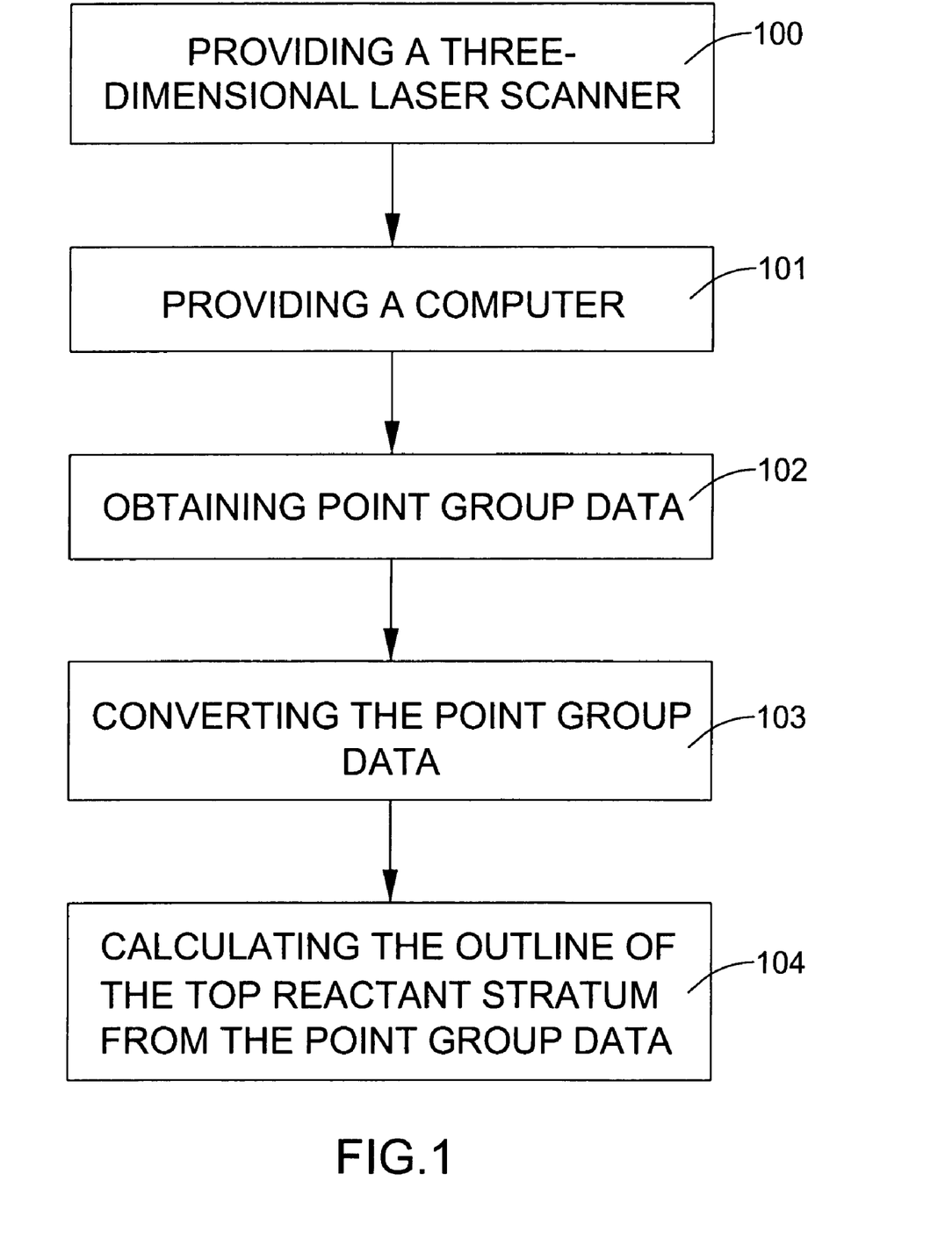
FIG. 1 is a flow chart of a method in accordance of the present invention.

With further reference to FIG. 1, the method in accordance with the present invention comprises steps of providing a three-dimensional (3-D) laser scanner (100), providing a computer (101), obtaining point group data (PGD) (102), optionally converting the PGD (103) and calculating the outline of the top reactant stratum from the PGD (104).

The step of providing a 3-D laser scanner (100) comprises directing a 3-D laser scanner (20) at the reactant strata in the blast furnace (10) to scan the inside of the blast furnace (10). The 3-D laser scanner (20) outputs PGD that represent digital data of the inside of the blast furnace (10). The 3-D laser scanner may be mounted at the neck of the blast furnace (10) at a specific angle and may output PGD of the local coordinates in the blast furnace (10). Furthermore, the PGD may comprise the PGD of the outline of the top reactant stratum and the exposed inner surface of the blast furnace (10).

The step of providing a computer (101) comprises connecting a computer to the 3-D laser scanner (20) to obtain the PGD of the local coordinates in the blast furnace (10). The computer has an optional coordinate converting program and a point group analysis program.

The coordinate converting program converts the PGD of the local coordinates in the blast furnace (10) into PGD of the world coordinates.

The point group analysis program measures the outline of the top reactant stratum from the PGD.

The step of obtaining PGD (102) comprises sending the PGD output by the 3-D laser scanner (20) to the computer.

The step of converting the PGD (103) is performed by the coordinate converting program in the computer to convert the PGD of the local coordinates in the blast furnace (10) into the PGD of the world coordinates.

The step of calculating the outline of the top reactant stratum from the PGD (104) is performed by the point group analysis program in the computer to construct a model of the inside of the blast furnace (10) then calculate the outline of the top reactant stratum in the blast furnace (10) from the PGD.

A first embodiment of the coordinate converting program comprises steps of defining a main axis of the inside of the blast furnace, defining a rotational axis and a rotational angle and converting the PGD of the local coordinates in the blast furnace into the PGD of the world coordinates.

Figure 3:
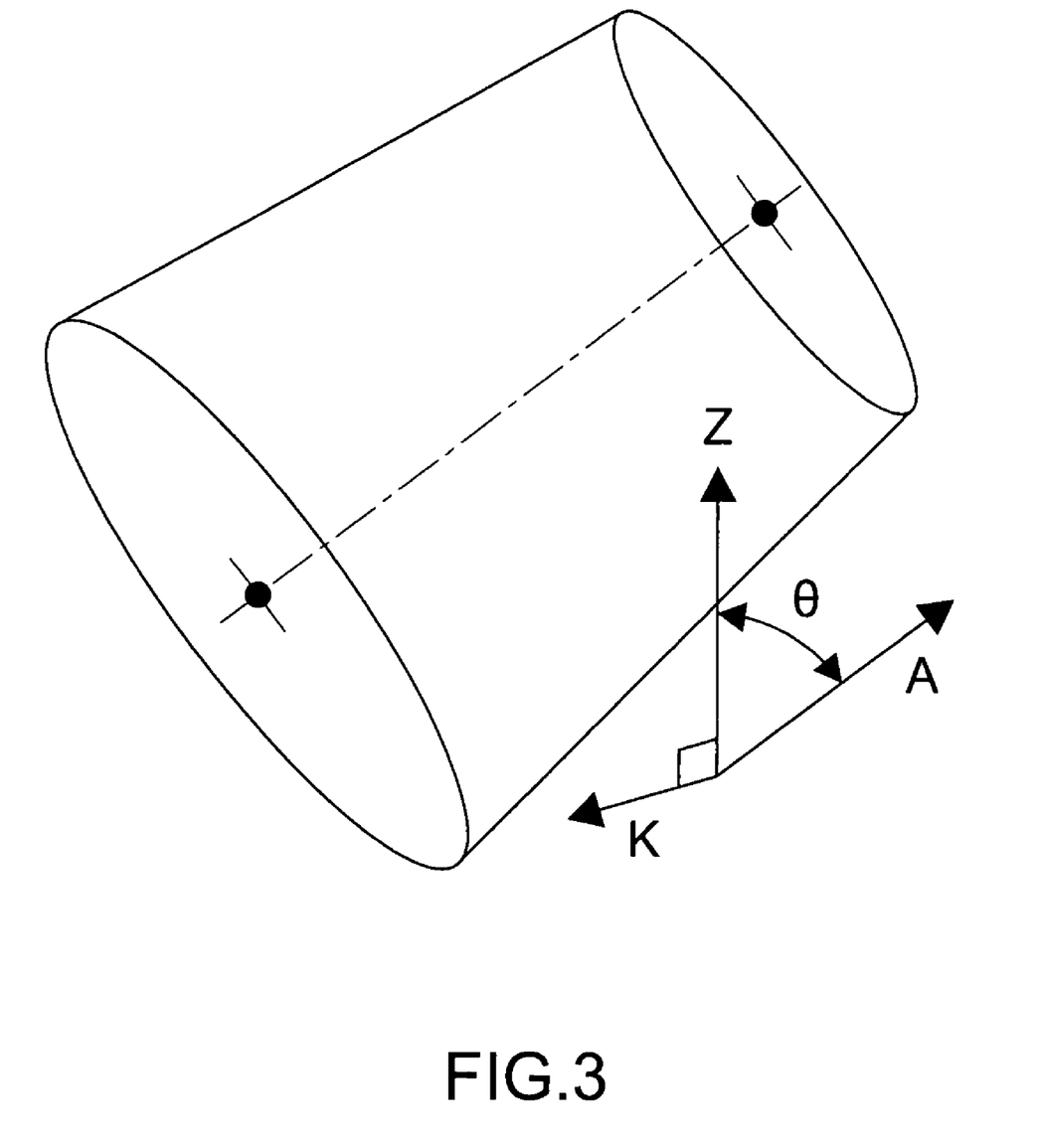
FIG. 3 is a schematic of the blast furnace in FIG. 2.

With reference to FIG. 3, the step of defining a main axis of the inside of the blast furnace comprises defining two circles having respective center points in the blast furnace (10) then defining a vector $\vec{A}$ through the center points of the two circles in the blast furnace (10).

The step of defining a rotational axis and rotational angle comprises defining a rotational axis vector $\vec{K}$ and a rotational angle $\theta$ by equations $$K = \frac{Z \times A}{|Z \times A|} \text{ and } \theta = \cos^{-1}\left(\frac{Z \cdot A}{|Z||A|}\right),$$

where vector $\vec{Z}$ is a coordinate axis vector in the world coordinates and the rotational angle $\theta$ is an included angle between the vectors $\vec{A}$ and $\vec{Z}$.

The step of converting the PGD of the local coordinates in the blast furnace into PGD of the world coordinates comprises rotating the points corresponding to the PGD of the local coordinates in the blast furnace (10) along the vector $\vec{K}$ with the angle minus (−)$\theta$ to satisfy an equation P:Q'=(Q·K)K(1−cos θ)+Q cos θ−(K×Q)sin θ, wherein Q is the PGD of the local coordinates in the blast furnace (10) and Q' is the PGD of the world coordinates.

Furthermore, a second embodiment of the coordinate converting program comprises steps of measuring a dip angle, defining a main axis of the inside of the blast furnace and a rotational axis and converting the PGD of the local coordinates in the blast furnace into the PGD of the world coordinates.

The step of measuring a dip angle is performed by an electronic spirit level to measure a dip angle $\theta$, wherein the dip angle is an included angle between a coordinate axis vector $\vec{Z}$ in the world coordinates and a main axis vector $\vec{A}$ representing a main axis of the inside of the blast furnace.

The step of defining a main axis of the inside of the blast furnace comprises calculating the main axis vector $\vec{A}$ representing a main axis of the inside of the blast furnace (10) from the equation $$\theta = \cos^{-1}\left(\frac{Z \cdot A}{|Z||A|}\right).$$

The step of defining a rotational axis comprises calculating a rotational axis vector $\vec{K}$ from the equation $$K = \frac{Z \times A}{|Z \times A|}.$$

The step of converting the PGD of the local coordinates in the blast furnace into the PGD of the world coordinates comprises rotating the points corresponding to the PGD of the local coordinates in the blast furnace (10) along the vector $\vec{K}$ with the angle −$\theta$ to satisfy the equation P:Q'=(Q·K)K(1−cos θ)+Q cos θ−(K×Q)sin θ, wherein Q is the PGD of the local coordinates in the blast furnace (10) and Q' is the PGD of the world coordinates.

In addition, the point group analysis program further may determine a compression ratio of coke and a ratio of iron ore to coke and may comprise steps of constructing a model of the inside of the blast furnace, separating the PGD of the outline of the top reactant stratum from the PGD of the inner surface of the blast furnace, optionally determining a compression ratio of the coke stratum and a ratio of the iron ore stratum to the coke stratum.

The step of constructing a model of the inside of the blast furnace comprises constructing a model of the inside of the blast furnace (10) from the PGD.

The step of separating the PGD of the outline of the top reactant stratum from the PGD of the exposed inner surface of the blast furnace comprises sifting the PGD of the outline of the top reactant stratum from the PGD of the exposed inner surface of the blast furnace (10) in the model of the inside of the blast furnace (10) by using a cone equation $(Z-Z_C)^2 = a^2((X-X_C)^2 + (Y-Y_C)^2)$, wherein (Xc, Yc, Zc) are coordinates at a peak of the cone shaped blast furnace (10) and a is an opening angle at the peak of the cone. The PGD of the exposed inner surface of the blast furnace (10) fits the cone equation $(Z-Z_C)^2 = a^2((X-X_C)^2 + (Y-Y_C)^2)$ because the blast furnace (10) is cone shaped. Therefore, the outline of the top reactant stratum will remain in the model of the inside of the blast furnace (10) if the PGD of the exposed inner surface of the blast furnace (10) are eliminated.

Figure 4:
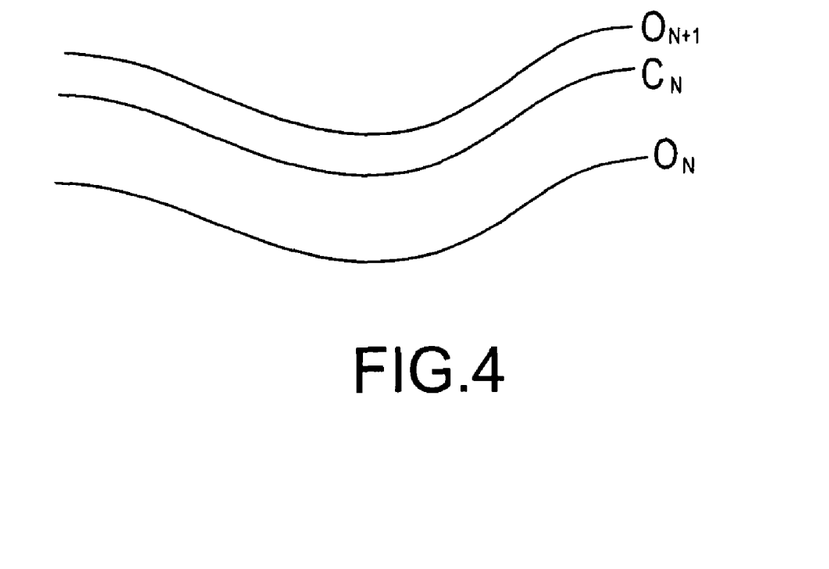
FIG. 4 is a diagram of reactant strata in the blast furnace.

With reference to FIG. 4, assuming that a first reactant stratum ($O_N$) is an iron ore stratum, a second reactant stratum is a coke stratum ($C_N$) and is layered on the first reactant stratum ($O_N$), and a third reactant stratum ($O_{N+1}$) is another iron ore stratum and is layered on the second reactant stratum ($C_N$). The third reactant stratum ($O_{N+1}$) compresses the second reactant stratum ($C_N$) so the volume of the second reactant stratum ($C_N$) is reduced.

The step of determining a compression ratio of coke comprises acts of calculating the volume of the coke stratum, calculating the volume of the coke and iron ore strata and evaluating a compression ratio of the coke stratum.

The act of calculating the volume of a coke stratum comprises calculating the volume ($V_1$) of the second reactant stratum ($C_N$) from the PGD of the outline of the top reactant stratum by numerical integration after charging coke into the blast furnace (10).

The act of calculating the volume of the coke and the iron ore strata comprises calculating the volume ($V_2$) of the second reactant stratum ($C_N$) and the third reactant stratum ($O_{N+1}$) by numerical integration after charging iron ore to form the third reactant stratum ($O_{N+1}$) into the blast furnace (10), wherein the volume of the third reactant stratum ($O_{N+1}$) is known to be $V_0$.

The act of evaluating a compression ratio of the coke stratum is evaluated by an equation $$\frac{V_1 - (V_2 - V_o)}{V_1}.$$

Figure 5:
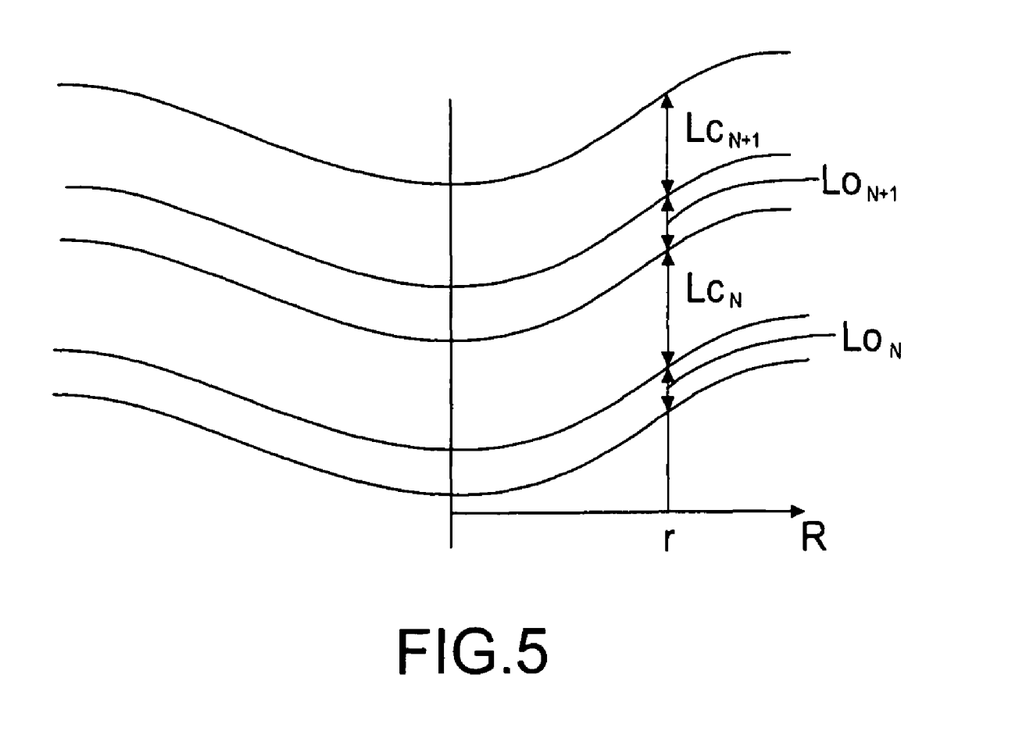
FIG. 5 is a diagram of a thickness of each reactant stratum in the blast furnace.

With reference to FIG. 5, the step of determining a ratio of iron ore to coke comprises acts of calculating the thickness of each reactant stratum and calculating a ratio of iron ore to coke.

The act of calculating the thickness of each reactant stratum comprises calculating the thickness of each reactant stratum from the PGD of the outline of the top reactant stratum after charging each reactant into the blast furnace (10). For example, the thickness of each iron ore stratum is $L_{Oi}$, where i is an integer. In addition, the thickness of each coke stratum is $L_{Ci}$.

The act of calculating a ratio of iron ore to coke comprises is evaluated by an equation $$\frac{\sum_i Lo_i}{\sum_i Lc_i},$$

wherein i=1, 2, 3 . . . .

Furthermore, the method for measuring a path of charging the reactant is an extension of the method for measuring an outline of a stratum of a reactant as described and comprise steps of providing at least one two-dimensional (2-D) laser scanner and calculating a path of the reactant being charged into the blast furnace.

Figure 6:
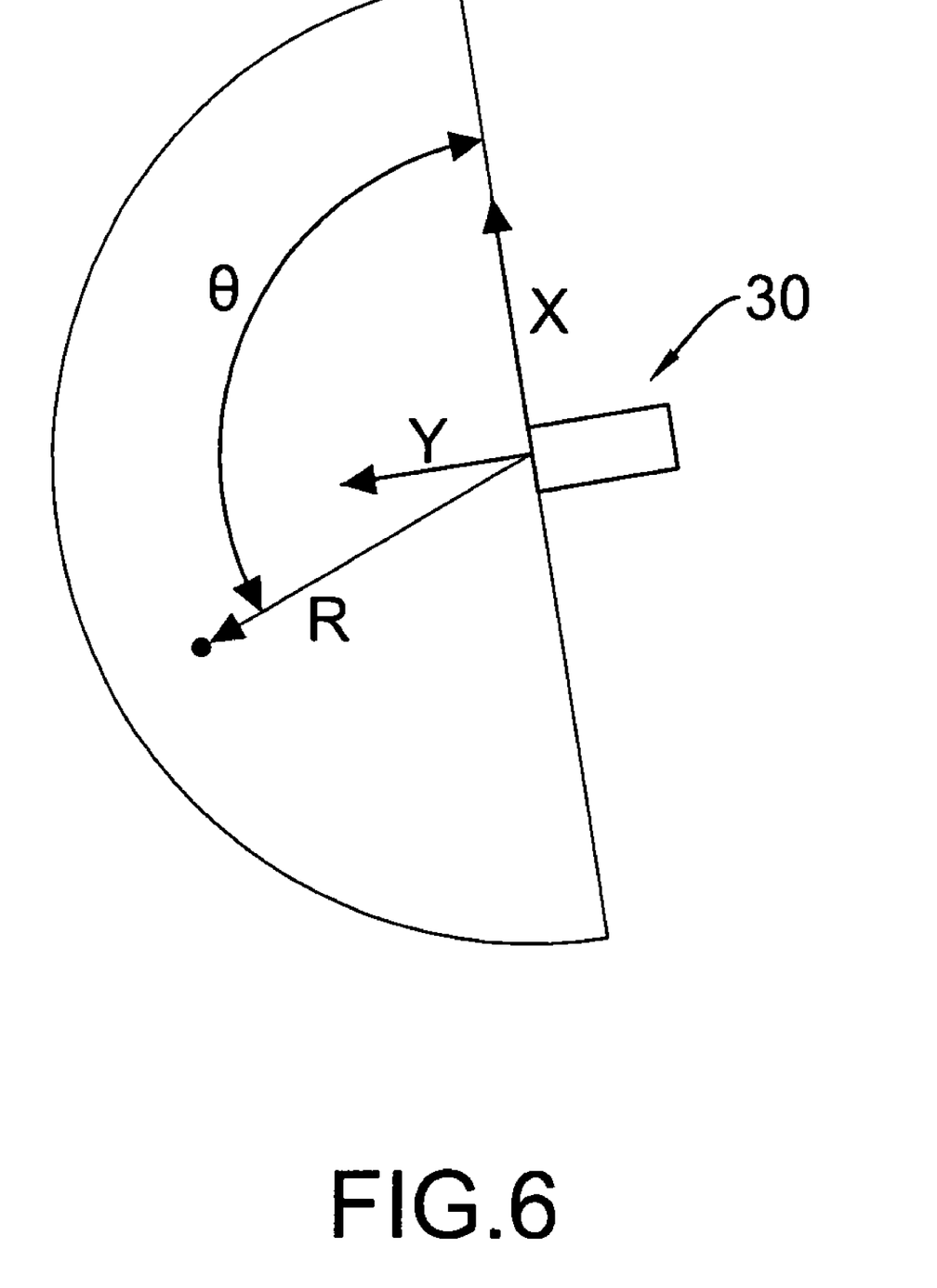
FIG. 6 is a diagram defining a scanning plane of a 2-D laser scanner.

With reference to FIG. 6, the step of providing at least one 2-D laser scanner comprises mounting at least one 2-D laser scanner (30) in the blast furnace (10) and setting a horizontal scanning plane. Two 2-D laser scanners (30) may be respectively mounted on the two lateral walls and are opposite to each other. Thus, the reactants charged by the feeder (40) must pass through the scanning planes of the 2-D laser scanners (30).

The step of calculating a path of charging the reactant comprises scanning the reactant spread by the feeder (40) and calculating a path of the reactant being charged. The two 2-D laser scanners (30) respectively have a left local coordinates and a right local coordinates, so the two local coordinates have to be corrected. A relationship between the left and right local coordinates represented by three parameters $P_x$, $P_y$, and $\theta$.

The described $P_x$, $P_y$ are determined by using a reflective board. The reflective board can be mounted on one of the 2-D laser scanners (30). Therefore, the parameters $P_x$, $P_y$ will be determined when the 2-D laser scanner (30) without the reflective board measures the position of the 2-D laser scanner with the reflective board. The described angle $\theta$ is determined by the electronic spirit level.

With such a method, operators can easily measure the outline of the top reactant stratum in the blast furnace. Furthermore, the method can allow operators to determine whether the distribution of the coke and iron ore are as designated by operational procedures, by combining the outline of the top reactant layer in the blast furnace with the path of the reactant being charged.

Even though numerous characteristics and advantages of the present invention have been set forth in the foregoing description, together with details of the structure and function of the invention, the disclosure is illustrative only. Changes may be made in detail, especially in matters of arrangement of parts within the principles of the invention to the full extent indicated by the broad general meaning of the terms in which the appended claims are expressed.

What is claimed is:

1. A method for measuring an outline of a stratum of a reactant applied to a blast furnace that is a container having
   an inner surface;
   multiple reactants being coke and iron ore, being layered in stratum in the container, covering part of the inner surface of the blast furnace, and each reactant stratum has an outline;
   an inside being the exposed inner surface of the blast furnace and the outline of the top reactant stratum;
   a top;
   a neck defined at the top of the blast furnace and having an opening; and
   a feeder mounted at the opening of the neck of the blast furnace to charge coke and iron ore into the blast furnace in turn;
   and the method comprising steps of:
   providing a single three-dimensional (3-D) laser scanner comprising mounting a 3-D laser scanner at the neck of the blast furnace at a specific angle, directing the 3-D laser scanner at the reactant strata in the blast furnace to scan the inside of the blast furnace and output point group data (PGD) that represent digital data of the inside of the blast furnace;
   providing a computer comprising connecting a computer to the 3-D laser scanner, and the computer having a point group analysis program that measures the outline of the top reactant stratum from the PGD;
   obtaining PGD comprising sending the PGD output by the 3-D laser scanner to the computer; and
   calculating the outline of the top reactant stratum from the PGD being performed by the point group analysis program in the computer to construct a model of the inside of the blast furnace then calculate the outline of the top reactant stratum in the blast furnace from the PGD.

2. The method as claimed in claim 1, wherein
   the PGD output by the 3-D laser scanner are PGD of the local coordinates in the blast furnace; and
   the computer further has a coordinate converting program that converts the PGD of local coordinates in the blast furnace into PGD of the world coordinates.

3. The method as claimed in claim 2, wherein the coordinate converting program comprises steps of
   defining a main axis of the inside of the blast furnace comprising defining a main axis vector that represents a main axis of the inside of the blast furnace;
   defining a rotational axis and a rotational angle comprising defining a rotational axis vector $\overline{K}$ and a rotational angle $\theta$ from the main axis vector; and
   converting the PGD of the local coordinates in the blast furnace into the PGD of the world coordinates comprising rotating the points corresponding to the PGD of the local coordinates in the blast furnace along the rotational axis vector $\overline{K}$ with the angle minus $(-)\theta$ to satisfy an equation $P:Q'=(Q\cdot K)K(1-\cos\theta)+Q\cos\theta-(K\times Q)\sin\theta$, wherein Q is the PGD of the local coordinates in the blast furnace (10) and Q' is PGD of the world coordinates.

4. The method as claimed in claim 3, wherein the step of defining a main axis of the inside of the blast furnace in the coordinate converting program defines two circles having respective center points in the blast furnace then defines a main axis vector through center points of the two circles in the blast furnace.

5. The method as claimed in claim 2, wherein the coordinate converting program comprises steps of
using an electronic spirit level to measure a dip angle $\theta$ that is an included angle between a coordinate axis vector in the world coordinates and a main axis vector representing a main axis of the inside of the blast furnace;
defining the main axis of the inside of the blast furnace comprising calculating the main axis vector from the dip angle $\theta$;
defining a rotational axis comprising calculating the rotational axis vector $\overline{K}$ from the dip angle $\theta$ and the main axis vector; and
converting the PGD of the local coordinates in the blast furnace into the PGD of the world coordinates comprising rotating the points corresponding to the PGD of the local coordinates in the blast furnace along the vector $\overline{K}$ with the angle $-\theta$ to satisfy an equation $P:Q'=(Q\cdot K)K(1-\cos\theta)+Q\cos\theta-(K\times Q)\sin\theta$, wherein Q is the PGD of the local coordinates in the blast furnace (10) and Q' is PGD of the world coordinates.

6. The method as claimed in claim 1, wherein
the PGD comprises PGD of the outline of the top reactant stratum and the PGD of the exposed inner surface of the blast furnace; and
the point group analysis program comprises steps of
constructing a model of the inside of the blast furnace comprising constructing a model of the inside of the blast furnace from the PGD; and
separating the PGD of the outline of the top reactant stratum from the PGD of the exposed inner surface of the blast furnace comprising sifting the PGD of the outline of the top reactant stratum from the PGD of the exposed inner surface of the blast furnace in the model of the inside of the blast furnace.

7. The method as claimed in claim 6, wherein
the blast furnace is cone shaped; and
the step of separating the PGD of the outline of the top reactant stratum from the PGD of the exposed inner surface of the blast furnace is operated by using a cone equation $(Z-Z_c)^2=a^2((X-X_c)^2+(Y-Y_c)^2)$ and eliminates the PGD that fit the cone equation.

8. The method as claimed in claim 7, wherein
the reactant strata respectively have a thickness; and
the point group analysis program further determines a ratio of iron ore to coke and further comprises a step of determining a ratio of iron ore to coke having acts of
calculating the thickness of each reactant stratum comprising calculating the thickness of each reactant stratum from the PGD of the outline of the top reactant stratum after charging each reactant into the blast furnace; and
calculating a ratio of iron ore to coke being evaluated by an equation $$\frac{\sum_i L o_i}{\sum_i L c_i},$$

wherein $i=1, 2, 3\ldots$, $L_{oi}$ is the thickness of each iron ore stratum, and $L_{ci}$ is the thickness of each coke stratum.

9. The method as claimed in claim 7, wherein
the reactant strata respectively have a volume; and
the point group analysis program further determines a compression ratio of coke and further comprises a step of determining a compression ratio of coke having acts of
calculating the volume of a coke stratum comprising calculating the volume ($V_1$) of a coke stratum from the PGD of the outline of the top reactant stratum by numerical integration after charging coke into the blast furnace;
calculating the volume of the coke stratum and an iron ore stratum that is piled on the coke stratum comprising calculating the volume ($V_2$) of the coke stratum and an iron ore stratum that is piled on the coke stratum by numerical integration after charging iron ore into the blast furnace, wherein the volume of iron ore layer is known to be $V_0$; and
evaluating a compression ratio of the coke stratum being evaluated by an equation $$\frac{V_1-(V_2-V_o)}{V_1}.$$

10. A method for measuring an outline of a stratum of a reactant and a path of charging the reactant using the method as claimed in claim 1 and comprising steps of:
providing at least one two-dimensional (2-D) laser scanner comprising mounting at least one 2-D laser scanner in the blast furnace and setting a horizontal scanning plane of the 2-D laser scanner so the reactants charged by the feeder passes through the scanning plane of the 2-D laser scanner; and
calculating a path of charging the reactant comprising scanning the reactant spread by the feeder and calculating a path of the reactant being charged.

11. The method as claimed in claim 10, wherein
the blast furnace further has two lateral walls; and
two 2-D laser scanners are respectively mounted on the two lateral walls and are opposite to each other.

* * * * *